US009135510B2

(12) United States Patent
Peynot et al.

(10) Patent No.: US 9,135,510 B2
(45) Date of Patent: Sep. 15, 2015

(54) METHOD OF PROCESSING SENSOR DATA FOR NAVIGATING A VEHICLE

(75) Inventors: Thierry Peynot, Sydney (AU); Christopher Brunner, Sydney (AU)

(73) Assignee: UNIVERSITY OF SYDNEY, Sydney (AU)

( * ) Notice: Subject to any disclaimer, the term of this patent is extended or adjusted under 35 U.S.C. 154(b) by 285 days.

(21) Appl. No.: 13/818,915

(22) PCT Filed: Aug. 24, 2011

(86) PCT No.: PCT/AU2011/001090
§ 371 (c)(1),
(2), (4) Date: May 1, 2013

(87) PCT Pub. No.: WO2012/024730
PCT Pub. Date: Mar. 1, 2012

(65) Prior Publication Data
US 2013/0211659 A1    Aug. 15, 2013

(30) Foreign Application Priority Data

Aug. 25, 2010  (AU) ............................. 2010903813

(51) Int. Cl.
*B60Q 1/50* (2006.01)
*G06K 9/00* (2006.01)
*G05D 1/02* (2006.01)
*G06K 9/03* (2006.01)
(Continued)

(52) U.S. Cl.
CPC .......... *G06K 9/00805* (2013.01); *G05D 1/0212* (2013.01); *G05D 1/0242* (2013.01); *G05D 1/0246* (2013.01); *G06K 9/036* (2013.01); *G06K 9/209* (2013.01); *G06T 7/0002* (2013.01); *G06T 2207/10016* (2013.01); *G06T 2207/30168* (2013.01); *G06T 2207/30261* (2013.01)

(58) Field of Classification Search
USPC .............. 701/23, 28, 29.2, 41, 33.7; 340/435, 340/438, 903
See application file for complete search history.

(56) References Cited

U.S. PATENT DOCUMENTS 6,930,593 B2 *  8/2005  Crawshaw ................... 340/435
2009/0310820 A1  12/2009  Williams
2010/0063672 A1   3/2010  Anderson

FOREIGN PATENT DOCUMENTS

WO    WO 2007/144580 A1    12/2007

OTHER PUBLICATIONS

International Search Report (PCT/ISA/210) issued on Oct. 25, 2011, by the Australian Patent Office as the International Searching Authority for International Application No. PCT/AU2011/001090.
(Continued)

Primary Examiner — Adam Tissot
(74) Attorney, Agent, or Firm — Maine Cernota & Rardin

(57) ABSTRACT

Apparatus for and method of processing sensor data for the purpose of navigating a vehicle (for example an autonomous or semi-autonomous vehicle), the sensor data being from a sensor (for example a camera) mounted on the vehicle. The method can include can include: for a number of time-steps, measuring a value of a parameter of a scene using the sensor to produce a sequence of images of the scene; determining a value of one or more image quality metrics (for example, spatial entropy and spatial information) in each image in the sequence; and identifying as either valid or invalid, a sub-sequence of images in the sequence based on the determined metric values.

16 Claims, 2 Drawing Sheets

(51) Int. Cl.
*G06K 9/20* (2006.01)
*G06T 7/00* (2006.01)

(56) References Cited

OTHER PUBLICATIONS

R. Madhavan et al., "Information-based Intelligent Unmanned Ground Vehicle Navigation", Proceedings of the IEEE/RSJ International Conference on Intelligent Robots and Systems 2003 (IROS 2003), Oct. 27-31, 2003, pp. 3485-3490, vol. 3.

European Search Report for EP Appl. No. 11819192.3, dated Apr. 11, 2014, 4 pages.
Yin Chen et al., Image Quality Measures for Predicting Automatic Target Recognition Performance, IEEE Aerospace Conference, Mar. 1-8, 2008, pp. 1-8.
Power, G. J. et al., 'Velocital information feature for charting spatiotemporal changes in digital image sequences', Journal of Electronic Imaging, Apr. 1999, vol. 8 Issue 2, pp. 167-175.
Office Action for AU Patent Application No. 2011293091, dated Jul. 1, 2015, 5 pages.

\* cited by examiner

METHOD OF PROCESSING SENSOR DATA FOR NAVIGATING A VEHICLE

FIELD OF THE INVENTION

The present invention relates to processing of sensor data. In particular, the present invention relates to the processing of data corresponding to images of a scene.

BACKGROUND

In the field of autonomous vehicles, the term "perception" relates to an autonomous vehicle obtaining information about its environment and current state through the use of various sensors.

Conventional perception systems tend to fail in a number of situations. In particular, conventional systems tend to fail in challenging environmental conditions, for example in environments where smoke or airborne dust is present. Many conventional perception systems tend to identify dust or smoke as an actual obstacle. Thus, the ability of an autonomous vehicle may be adversely affected because obstacles that are not present have been identified by the vehicle's perception system.

Separate to the field of autonomous vehicles, within the television and video industry a number of "Visual Quality Metrics" have been developed. Such metrics typically attempt to objectively quantify how a human viewer would evaluate the quality of a video stream or image. Typically, these metrics are developed to highlight errors caused by compression and transmission, and are frequently tailored to the human vision system.

SUMMARY OF THE INVENTION

In a first aspect the present invention provides a method of processing sensor data for the purpose of navigating a vehicle, the sensor data being from a sensor mounted on the vehicle, the method comprising: for a number of time-steps, measuring a value of a parameter of a scene using the sensor to produce a sequence of images of the scene; determining a value of one or more image quality metrics in each image in the sequence; and identifying as either valid or invalid, a sub-sequence of images in the sequence based on the determined metric values.

The vehicle may be an autonomous vehicle, or a semi-autonomous vehicle.

The method may further comprise performing a perception process for the autonomous vehicle in which image sub-sequences identified as valid are treated differently to image sub-sequences identified as invalid.

The step of identifying as either valid or invalid, a sub-sequence of images in the sequence based on the determined metric values, may comprise: identifying as either valid or invalid, a sub-sequence of images in the sequence based on the evolution of the determined metric values within that sub-sequence.

The one or more image quality metrics may comprise more than one different image quality metrics.

The step of identifying as either valid or invalid, images in the sequence based on the determined metric values, may comprise: for a sub-sequence, comparing the values of the different metrics determined in that sub-sequence.

The one or more image quality metrics may comprise one or more of the following metrics: a metric indicative of brightness of an image, a metric indicative of contrast within an image, a metric indicative blur within an image, a metric indicative of image sharpness, a metric indicative of a level of spatial information within an image, and a metric indicative of spatial entropy of an image.

The one or more image quality metrics may comprise the following metrics: a metric indicative of brightness of an image, a metric indicative of contrast within an image, and a metric indicative of a level of spatial information within an image.

The one or more image quality metrics may comprise the following metrics: a metric indicative of a level of spatial information within an image, and a metric indicative of spatial entropy of an image.

The method may further comprise: for each of the time-steps, measuring a value of a further parameter of the scene using a further sensor to produce a further sequence of images of the scene; determining a value of the one or more image quality metrics in each image in the further sequence; wherein the step of identifying as either valid or invalid, a sub-sequence of images in the sequence based on the determined metric values, comprises comparing the values of a metric determined in that sub-sequence to the values of that metric determined in the further sub-sequence of images; the further sub-sequence is a sub-sequence of images in the further sequence; the further sub-sequence corresponds to the same time-steps as the sub-sequence; the further sensor is a different type of sensor to the sensor; and the further parameter is a different parameter to the parameter.

In a further aspect, the present invention provides a method of navigating a vehicle, the method comprising a method of processing sensor data according to the above aspect.

In a further aspect, the present invention provides apparatus for processing sensor data for the purpose of navigating a vehicle, the apparatus comprising: a sensor mounted on the vehicle, the sensor arranged to, for a number of time-steps, measure a value of a parameter of a scene to produce a sequence of images of the scene; and one or more processors arranged to: determine a value of one or more image quality metrics in each image in the sequence; and identify as either valid or invalid, a sub-sequence of images in the sequence based on the determined metric values.

The one or more processors may be further arranged to perform a perception process for the autonomous vehicle using the image sub-sequences identified as valid.

In a further aspect, the resent invention provides a computer program or plurality of computer programs arranged such that when executed by a computer system it/they cause the computer system to operate in accordance with the method of any of the above aspects.

In a further aspect the present invention provides a machine readable storage medium storing a computer program or at least one of the plurality of computer programs according to the above aspect.

DETAILED DESCRIPTION

Figure 1:
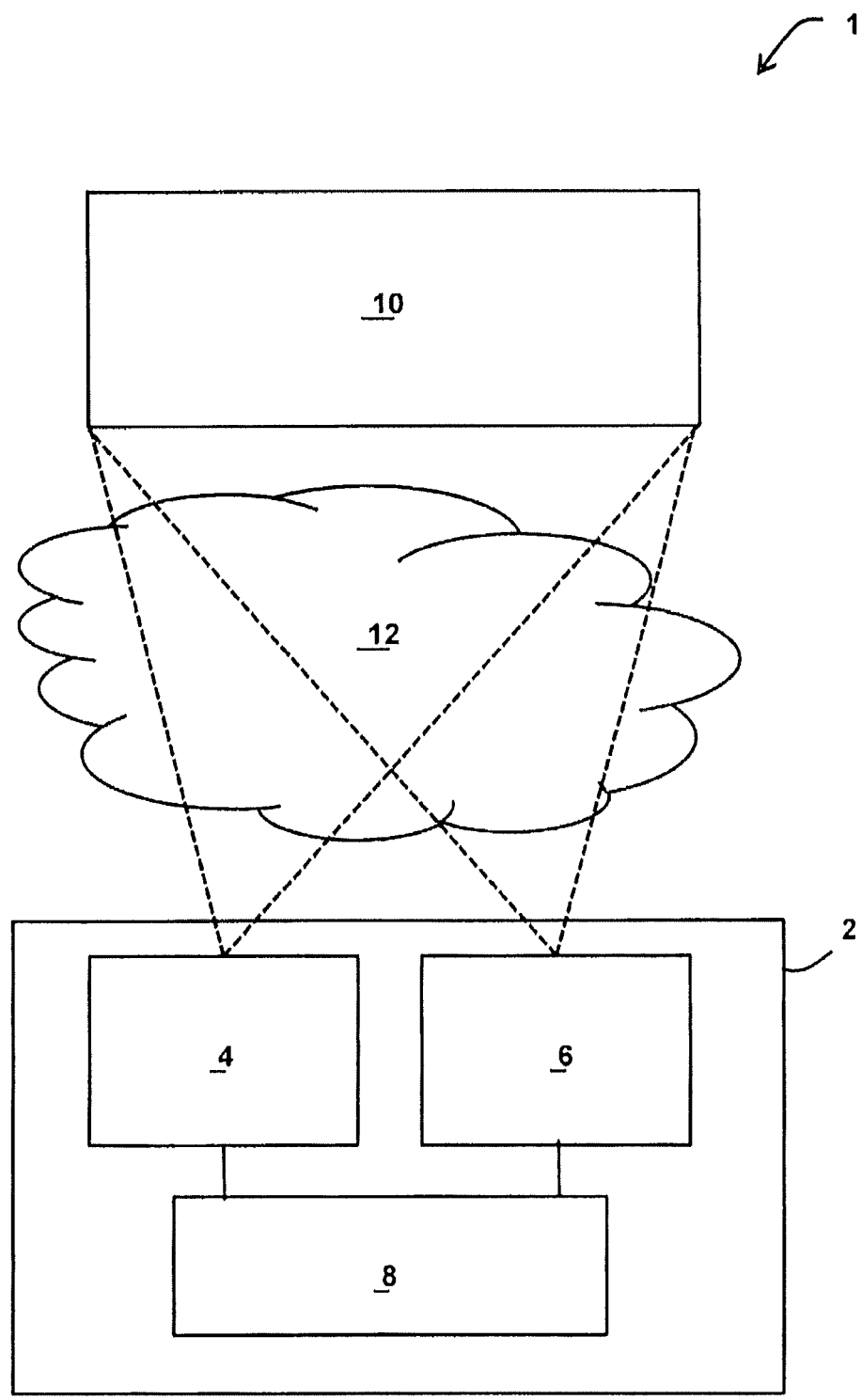
FIG. 1 is a schematic illustration (not to scale) of an example scenario in which an embodiment of a process for improving perception integrity is implemented.

FIG. 1 is a schematic illustration (not to scale) of an example scenario 1 in which an embodiment of a process for improving perception integrity is implemented.

The terminology "perception" is used herein to refer to a process by which a vehicle's sensors are used to perform measurements of the vehicle's surroundings and process these measurements in order to enable the vehicle to successfully navigate through the surroundings. The process for improving perception integrity is described in more detail later below with reference to FIG. 2.

In the scenario 1, a vehicle 2 comprises a visible light/colour camera 4, an infrared camera 6 and a processor 8. The colour camera 4 and the infrared camera 6 are each coupled to the processor 8. The vehicle 2 is a land-based vehicle and may be stationary or moving.

In the scenario 1, the vehicle 2 performs autonomous navigation within its surroundings. The vehicle's surroundings comprise a plurality of obstacles, which are represented in FIG. 1 by a single box and indicated by the reference numeral 10.

The autonomous navigation of the vehicle 2 is facilitated by measurements made by the vehicle 2 of the obstacles 10. These measurements are made using the colour camera 4 and the infrared camera 6.

The colour camera 4 takes light intensity and colour measurements of the obstacles 10 from the vehicle 2. This intensity data (hereinafter referred to as "colour data") is sent from the colour camera 4 to the processor 8. The colour data is, in effect, a visual image of the obstacles 10 and is hereinafter referred to as the "colour image". The colour camera 4 is a conventional colour camera, e.g. a Prosilica™ mono-CCD colour camera.

The infrared camera 6 takes infrared measurements of the obstacles 10 from the vehicle 2. This data (hereinafter referred to as "infrared data") is sent from the infrared camera 6 to the processor 8. The infrared data is, in effect, an image of the obstacles 10 and/or the dust cloud 12. This image is hereinafter referred to as the "infrared image". The infrared camera 6 is a conventional infrared camera, e.g. a Raytheon™ infrared camera.

In this embodiment, the camera image and the infrared image are continuously acquired and time-stamped. However, in other embodiments, images and scans may be acquired on intermittent bases. Also, in other embodiments, time-stamping need not be employed, and instead any other suitable form of time-alignment or image registration may be used.

The use of the colour camera 4 and the infrared camera 6 to make measurements of the obstacles 10 is represented in FIG. 1 by sets of dotted lines between the colour camera 4 and the obstacles 10 and between the infrared camera 6 and the obstacles 10 respectively.

In the scenario 1, the images of the obstacles 10 generated using the colour camera 4 and the infrared camera 6 are made through a dust cloud 12. In other words, the dust cloud 12 at least partially obscures the obstacles 10 from the colour camera 4 and/or infrared camera 6 on the vehicle 2. For the purpose of illustrating the present invention, it is assumed that the presence of the dust cloud 12 affects the measurements taken by the camera 4 and the infrared camera 6 to different degrees. In other scenarios, there may, for example, be objects in front of, behind, and/or within the dust cloud 12.

An embodiment of a process for improving perception integrity, i.e. improving the vehicle's perception of its surroundings (in particular, the obstacles 10) in the presence of the dust cloud 12, will now be described.

Figure 2:
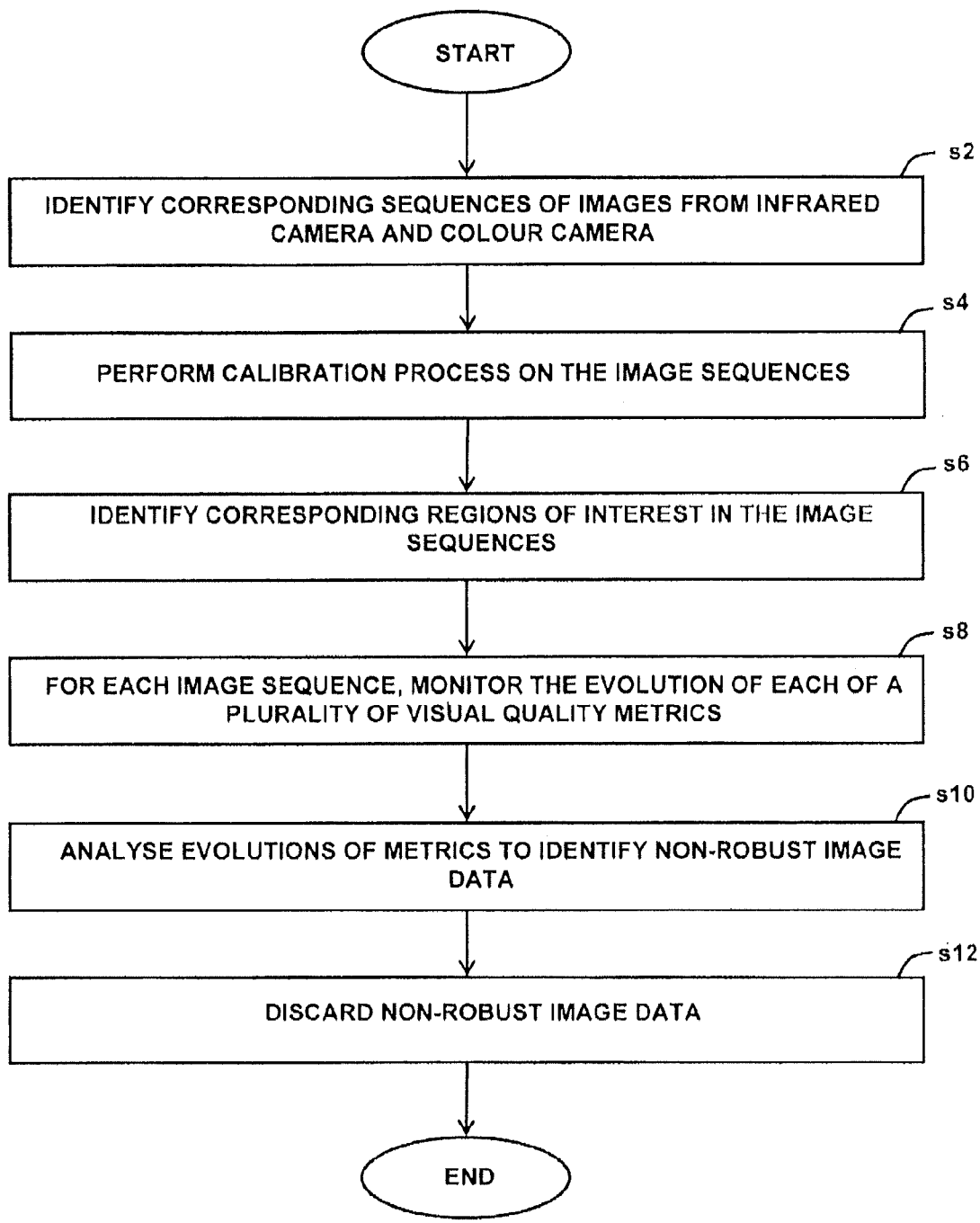
FIG. 2 is a process flow chart showing certain steps of an embodiment of the process for improving perception integrity.

FIG. 2 is a process flow chart showing certain steps of an embodiment of the process for improving perception integrity.

In this embodiment, the process comprises validating image data for use with a perception algorithm. In this embodiment, any appropriate perception algorithm is used, for example, a conventional feature-based perception method, or a conventional area-based perception method.

It should be noted that certain of the process steps depicted in the flowchart of FIG. 2 and described above may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

At step s2, a continuous sequence of images from the colour camera 4 and a corresponding continuous sequence of images from the infrared camera 6 are identified.

In other words, a sequence of images that is taken using the colour camera 4 between two different time-steps is identified. Also, a sequence of images that is taken using the infrared camera 6 between those two time-steps is identified.

This step is facilitated by the time-stamping of images described above.

At step s4, a calibration process is performed on the colour image and the infrared image to determine an estimate of the transformation between the colour frame and the infrared frame. This transformation is hereinafter referred to as the "colour-infrared transformation". In this embodiment, this calibration process is a conventional process. For example, the colour camera 4 and the infrared camera 6 may be calibrated separately using the camera calibration toolbox for Matlab™ developed by Bouget et al., and the estimate of the colour-infrared transformation may be determined using a conventional technique, such as an image registration technique.

This step provides that for every point observed by the infrared camera (i.e. that has corresponding infrared data) which is also observed by the colour camera (i.e. belongs to the camera image too), the corresponding colour data can be found using the colour-infrared transformation.

At step s6, a region of interest in the sequence of images from the colour camera 4, and a corresponding region of interest in the sequence of images from the infrared camera 6, is identified. This step may, for example, be performed as follows.

Firstly, a region of interest in one of the images of one of the sequences is specified by a user (e.g. the first image in the sequence of images from the colour camera 4 is specified).

Secondly, this region of interest is tracked into the remaining images of its sequence (e.g. the region of interest is identified in each of the other images in the sequence of images from the colour camera 4). This tracking may be performed, for example, using the Self Adaptive Discriminant (SAD) Filter described in WO2007/144580, which is incorporated herein by reference.

Thirdly, the position of region of interest in each of the images in the other sequence (e.g. the sequence from the infrared camera 6) is determined. This may be done by using the colour-infrared transformation (determined at step s4) to map a region of interest in a colour image to the corresponding infrared image.

In other embodiments, step s6 may be performed in a different way. For example, a region of interest may be specified in an initial image of one sequence. The position of this region in the corresponding initial image of the other sequence may then be determined, e.g. using the colour-infrared transformation. The region of interest in the two sequences may then be tracked through the respective sequences separately.

In other embodiments, no region of interest is specified. Instead the process may be performed on whole images, or images that have been cropped. Thus, in other embodiments steps s4 and s6 may be omitted. These steps may be replaced by a process comprising cropping images in the sequences, and/or matching the resolutions of images in one sequence to those of images in the other sequence.

At step s8, for each sequence of images, a plurality of Visual Quality metrics is monitored. The metrics are monitored in the region of interest, through that sequence.

In other words, a value of each Visual Quality metric in a plurality of such metrics is measured in the region of interest in each of the images in the sequence from the camera 4. Also, a value of each Visual Quality metric in a plurality of such metrics is measured in the region of interest in each of the images in the sequence from the infrared camera 6. Equivalently, the evolution of each of a plurality of metrics through each image sequence is determined.

Examples of relevant Visual Quality metrics are as follows.

A first possible Visual Quality metric is "Brightness". Brightness is a measure of the average luminosity of all the pixels in an image.

Typically, a bright environment is preferable to a dark environment as objects can be observed more clearly. However, brightness also needs to be limited to avoid saturation. In general, extremely dark or bright conditions are not desirable for perception applications. Changes in brightness can strongly affect all area-based perception methods. The effect on feature-based perception methods is much more limited but not necessarily absent if it causes relatively 'weak' features to be lost. In the context of outdoor robotics, metrics measuring brightness is that they are directly affected by the lighting conditions of the environment. Challenging conditions such as dust and smoke can also influence the brightness of parts of an image depending on the background environment and the refraction of light.

A minimum and a maximum threshold can be set on Brightness to identify extreme situations when an image is not useful for the considered application. Out of these extreme cases, a brightness metric is usually not a relevant indicator of image quality in its own, but it could be used in combination with other metrics for the discrimination of situations where apparent variations of "quality" are in fact only due to a change in lighting conditions.

A second possible Visual Quality metric is "Contrast". Contrast is a measure of the relative luminance in an image or region. It can be defined as the difference in brightness of objects within the same field of view. Higher contrast of an image is often associated with better quality as it makes features in the image easier to extract.

Various methods using a contrast metric are known. For example, the Root-Mean-Square (RMS) contrast metric may be used. This metric may be used globally (i.e. on the whole image) and/or locally (on patches in the images). The RMS contrast value for a whole image is given by:

$$C^{RMS} = \sqrt{\frac{1}{MN}\sum_{i=0}^{N-1}\sum_{i=0}^{M-1}(L_{ij} - \bar{L})^2}$$

where $L_{ij}$ is the ith and jth element of the two dimensional image of size M×N and $\bar{L}$ is the average luminance in the image.

This example contrast metric assumes that a histogram of intensities of the pixels in the image can be modelled by a Gaussian distribution. In a more local analysis of Contrast using the same RMS contrast metric, for each pixel of the image a local contrast is computed using, for example, a patch of e.g. 10×10 neighbouring pixels. The contrast value for the whole image is then calculated by averaging all the local contrast values across the whole image.

Good contrast tends to be important for many feature-based perception methods. This is because corners, ridges or edges tend to be identified using the relative intensity of neighbouring pixels. A higher contrast is also preferable for area-based methods (to have a better signal to-noise ratio). A minimum of contrast is usually needed in both cases. Therefore a corresponding threshold (for a minimum contrast level) can be defined. Challenging conditions such as dust and smoke partially obscure areas in the image, and therefore affect its global contrast. Whether it increases or decreases as a result depends on the relative intensity of the dust and smoke compared to the background environment. However, locally, within the smoke/dust cloud, the contrast is consistently diminished, reducing the quality of corresponding portions of the image.

Without utilising further information (e.g. other metrics), the RMS Contrast of the whole image tends to be a poor method of evaluating the quality of an image, due to the dependence on the background characteristics and the Gaussian assumption. The Gaussian approximation for the distribution of intensity values of the pixels means that a few very bright or very dark pixels can cause a large standard deviation when contrast in much of the image is in fact very low. This metric is preferably used by itself if the background is known, or the contrast levels drops to a critically low value. In the latter case, the image can be judged as poor quality and unlikely to provide any useful data for perception algorithms.

Calculating the RMS contrast at a pixel-by-pixel level using the method described above tends to have a high computational cost. Thus, a more appropriate method for real-time applications would use regions of interests (ROI) defined by specifying an appropriate size for a sub-image or by focussing on areas where challenging conditions are expected to appear (if such information is available) and checking the evolution of contrast in them.

A third possible Visual Quality metric is "Blur". Blurred features are harder to differentiate as the boundaries become smeared. This may lead to difficulties in image analysis and scene interpretation.

So called "Marziliano Blur" is a method of measuring blur that is quick to compute and relatively intuitive. The method is as follows. Firstly, a Sobel filter is applied to the image to extract vertical edges and a threshold is applied to the edge-filtered-image. Then, for each location of non-zero pixel, the local maximum and minimum of luminosity values are found along the horizontal rows of the original image. The distance between these local extrema, expressed in number of pixels, is considered to be the local blur value. The global blur value (measured in pixels) is determined by averaging the local blur measurements over all suitable edge locations, i.e.

$$\text{Blur} = \frac{1}{N}\sum_{i=1}^{N}(d_i)$$

where N is the number of pixels used to calculate the blur and $d_1$ is the distance between the two local extrema of luminosity around pixel i.

The blurriness of the image can strongly affect feature based perception methods, as it reduces the saliency of objects. On the contrary, the effect of blurriness on area-based perception methods is limited, unless a sudden change in blur occurs. In normal conditions, the blur from a sensor tends to remain relatively constant regardless of the background environment and changes to lighting conditions.

In challenging conditions such as dust and smoke, the overall blur of the visual images tends to be seen to increase significantly. By setting an upper threshold on the blur, challenging conditions tend to be identifiable. However, the value of Blur highly depends on the threshold applied to the edge image, and on the number of edges considered in the calculation of the metric, as a result.

In the case of infrared images, the signal-to-noise ratio tends to be much lower than for other images. When the background is obscured by challenging conditions strong edges are dimmed or lost, and small edges essentially due to the noise become dominant in the calculation of Blur, resulting in an increase of the metric. This makes this particular form of a Blur metric difficult to use with images from an infrared camera, however it tends to be more useful with other types of sensor.

A fourth possible Visual Quality metric is "Sharpness". Sharpness (or acutance) describes the rate of change of luminosity with respect to spatial position.

The sharpness of an image is found by averaging the gradient between neighbouring cells, i.e.

$$\text{Acutance} = \frac{Gx^2}{I_o} \times C$$

$$\text{where } Gx^2 = \sum \left(\frac{\Delta I^2}{n}\right);$$

ΔI is the difference in the grey scale value between a pixel and each of its surrounding pixels;
n is the total number of contributing values, i.e. the number of contributing pixels;
$I_o$ is the mean luminosity value of the image; and
C is a scaling factor.

Sharpness tends to highly affect feature-based perception methods (in particular, those methods using features such as edge or corner detectors tends to be highly affected). Area-based methods tend not to be affected much by images that are not sharp. However, both categories of perception methods (feature based, and area based) tend to experience difficulties with images whose sharpness changes rapidly.

Sharpness is dependent on the focus of the sensor being used. Thus, the presence of challenging conditions (cloud, dust etc.) tends to decrease the sharpness of images as the background edges are dulled.

Determining a value for a sharpness metric may involve using an edge detector on an image, and averaging the intensities of the edges over the whole image.

Further possible Visual Quality metrics are "Spatial Information (SI)" and "Spatial Entropy (SE)"

To compute SI, an edge detector (such as a Sobel filter) is first used on the input image. SI is then defined as the first standard deviation of the resulting distribution of intensities in the Sobel image, i.e. the intensities of edges in the original image. Since determining SI involves evaluating the amount of structure in an image, it can be applied in the same way to heterogeneous sensors such as the colour camera 4 and the infrared camera 6.

This definition of SI relies on the assumption that the distribution of intensities in the Sobel-filtered image can be modelled as a Gaussian, with an average close to zero. In this case, the distribution can be characterised by its standard deviation. In most edge-filtered-images, this assumption tends to be reasonable. Since dust or smoke clouds tend to obscure features in the background and contain very little structure, SI tends to be a useful tool to monitor the appearance of such environmental conditions (at least in cases where dust or smoke was shown to dim or obscure most background features, i.e. when the Gaussian assumption was acceptable).

However, in some situations, e.g. in the presence of foreground objects, the known challenging conditions can actually highlight the edges of these foreground objects while still obscuring background features. These high intensity edges tend to have a strong impact on SI, for example, making it increase significantly despite the reduction of structure everywhere else in the image. In such situations the Gaussian assumption tends not to be valid, which means the first standard deviation (and therefore SI) tends not to characterise the distribution, i.e. the actual amount of structure in the image.

To overcome this issue, a Spatial Entropy (SE) metric may be used. SE models the intensity distribution of an edge-filtered image using entropy. The entropy of an edge-filtered-image measures the variety of edge intensity values without giving "weight" to the magnitude of the intensity values, as it happens with SI. An edge image that contains a large variety of intensity values has greater "information content" than one that has the same spatial distribution of edges all at the same intensity. This usually means that the image is more useful for an application, especially feature-based methods.

SE can be useful in discriminating the challenging conditions that SI may fail to identify. Typically, in situations where most features are behind an obscurant (e.g. dust), SI and SE both decrease and (jointly) confirm that features are being dimmed or lost. However, if SI and SE metrics disagree, this usually means that the Gaussian approximation of SI is not appropriate. For example if SI is increasing but SE is decreasing, then some features in the environment are being obscured while others are becoming more intense.

Very low values for Spatial Entropy usually indicate that there is very little information in the image. However, a black and white image of edges (e.g. a checker board) may contain a great deal of useful information for perception but because it uses only two values for intensity, its entropy will be very low. In natural environments, such a situation is extremely unlikely, making SE relevant on its own. However, in such a case the value of SI would typically be high. Therefore, both SI and SE can be used in conjunction to differentiate such situations. For example, when conditions are clear, both SI and SE are typically stable. If dust or smoke etc. were to cover most of the image (including foreground objects), this would typically correspond to a clear drop in both SI and SE. However, if dust or smoke etc. were to cover much of the background, but pass behind a foreground object, typically SI would increases rapidly while SE would decrease.

In other words, if both SI and SE are increasing, the amount of structure in an image is increasing (e.g. there is a decreasing amount of dust/smoke in front of objects). Also, if SE is increasing but SI is decreasing, the general amount of structure in an image is increasing but some strong edges are getting weaker (e.g. there is less dust/smoke in background, and there are objects in front of the dust/smoke cloud). Also, if SI is increasing but SE is decreasing, the general amount of structure in the image is decreasing, but some edges are getting stronger (e.g. there is more dust/smoke in background, and there are objects in front of the dust/smoke cloud). Also, if both SI and SE are decreasing, the amount of structure in the image is decreasing (e.g. there is more dust/smoke in front of most objects).

SI and SE measure the amount of structure in an image. As such, they are particularly relevant to feature-based methods. Setting a minimum threshold of SI and SE tends to allow one to identify when an image is unlikely to be useful for applications using feature-based methods. On the other hand, SI and SE have little relevance to area-based methods. Challenging conditions such as dust and smoke typically reduce the values of SI and SE when they obscure the background environment.

At step s10, the monitored evolutions of the metrics are analysed to identify non-robust (i.e. low quality) image data.

In this embodiment, the metric evolutions are analysed to evaluate image quality in a variety of ways.

The first is to check a single metric value for an image. As discussed for each metric above, due to the generality of metrics and the diversity of environments the vehicle 2 may operate in, it tends to be rarely possible to discriminate poor quality images from any single metric value, except in extreme cases. Only when the value for the metric is approaching maximum or minimum values, for example if the contrast drops below a critical level, can it definitively indicate that the sensor data is unlikely to be useful for further perception.

The second is to monitor a metric's evolution through a single image sequence. The evolution of an individual metric can be used to monitor changes in the environment. Since unmodelled changes in environments will effect perception applications, unexpected changes in a metric may indicate that challenging conditions are occurring. For example, a sudden reduction in SI occurs when features are obscured or lost. Similarly, most metrics tend to be unstable under challenging conditions compared to normal conditions. However, due to the motion of the vehicle 2, the metric will evolve according to the change in the area of the environment which is currently perceived. Consequently, implementing a method to compensate for this influence of vehicle motion on the metrics is preferable. One example method for compensating for the motion of a vehicle is described in more detail later below.

The third is to compare relative evolutions of different metrics for a single image sequence. The combination of metrics that have some relationship can lead to further discrimination. The use of a combination of Brightness, Contrast and SI metrics is particularly useful for evaluating changes in intensity. Also, the use of a combination of SI and SE metrics is particularly useful for evaluating changes in structure in the image.

The fourth is to compare the evolutions of a metric in different image sequences. If the presence of a challenging environmental condition has been detected in some images captured by a first sensor, then the corresponding images taken by different sensors could be analysed e.g. to determine whether there was indeed such a condition and that there is not a fault with the first sensor (is there is a fault, all data from this sensor could be identified as non-robust), or e.g. to help identify the nature of the challenging environmental condition. Metrics that transform aspects of the images into characteristics that are comparable between the two types of sensors are preferred.

At step s12, non robust image data identified at step s10 is discarded, i.e. such non-robust data is not used for the purposes of navigation of the vehicle 2. This advantageously avoids the utilising of non-robust data for the purposes of perception. Also, the above described method advantageously tends to provide better perception capabilities of the vehicle 2. In other words, the above described method advantageously tends to increase the integrity of a perception system of the vehicle 2.

Thus, a method of improving perception integrity for an autonomous vehicle 2 is provided.

An example process for compensating for the motion of the vehicle 2 is as follows.

The method of motion compensation approximates vehicular motion between successive frame acquisitions by an affine transformation. This affine transformation is calculated using sensing data that is fully independent from the sensors 4, 6. In this embodiment, a cm-accuracy dGPS/INS system is used to facilitate the determination of this transformation. In this embodiment, this system is mounted on the vehicle 2. Once the affine transformation has been applied to an image sequence, in this embodiment the images are cropped. This is done so that consecutive images approximately register, i.e. so that there is sufficient overlap between the images in the sequence. The evolutions of metrics on these overlapping cropped images are then analysed as described above.

An advantage of the above described method is that it tends to increase the integrity of a vehicle's perception capabilities in challenging environmental conditions, such as the presence of smoke or airborne dust. The increasing of the integrity of the vehicle's perception capabilities tends to enable the vehicle to navigate better within an environment.

The present invention advantageously analyses and compares the evolution of Visual Quality metrics through a sequence of images in order to identify non-robust image data within that sequence. Thus, a method of validating image data is provided.

An advantage provided by the above described method is that it tends to be possible to evaluate image data quality and its evolution in a way that allows comparison of data between heterogeneous cameras (e.g. the colour and infrared cameras). This tends to facilitate the discrimination of different challenging environmental conditions (e.g. presence of airborne dust or smoke) and select the most appropriate type of sensor (camera) for that situation.

In the above embodiments the vehicle is a land-based vehicle. However, in other embodiments the vehicle is a different type of vehicle, for example an aircraft.

In the above embodiments the vehicle performs autonomous navigation. However, in other embodiments navigation of the vehicle is not performed autonomously. For example, in other embodiments an embodiment of a method of improving the integrity of perception is used to perform semi-autonomous navigation, and/or support/advise a human navigator of a vehicle (e.g. a driver or a pilot) who may be on or remote from the vehicle.

In the above embodiments the vehicle comprises an infrared camera and a colour camera. However, in other embodiments the vehicle comprises any two different heterogeneous sensors, the data from which may be processed according to the method of improving perception integrity as described above. For example, in other embodiments one of the sensors is a laser scanner.

In the above embodiments there are two heterogeneous sensors (the infrared camera and the camera). However, in other embodiments there are more than two sensors, including at least two heterogeneous sensors. Also, in other embodiments, the vehicle comprises only a single type of sensor and/or a single sensor.

In the above embodiments, the images taken by the sensors are affected by the presence of the dust cloud. However, in other embodiments the sensor images are affected by a different entity, for example smoke, cloud, or fog. Furthermore, the process may also be used advantageously in situations in which there are no dust clouds etc.

Apparatus, including the processor, for performing the method steps described above, may be provided by an apparatus having components on the vehicle, external to the vehicle, or by an apparatus having some components on the vehicle and others remote from the vehicle. Also, the apparatus may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

The invention claimed is:

1. A method of processing sensor data for navigating a vehicle, the sensor data being from a sensor mounted on the vehicle, the method comprising:
   for a number of time-steps, measuring a value of a parameter of a scene using the sensor to produce a sequence of images of the scene;
   using a computing device to determine a value of one or more image quality metrics in each image in the sequence, wherein computing said values of said image quality metrics does not include determining position values of the vehicle from the images; and
   using the computing device to identify as either valid or invalid, a sub-sequence of images in the sequence based on an evolution of the determined image quality metric values within that sub-sequence.

2. A method according to claim 1, wherein the vehicle is an autonomous vehicle, or a semi-autonomous vehicle.

3. A method according to claim 2 further comprising:
   performing a perception process for the autonomous vehicle in which image subsequences identified as valid are treated differently to image sub-sequences identified as invalid.

4. A method according to claim 1, wherein the one or more image quality metric values comprise more than one different image quality metric.

5. A method according to claim 4, wherein the identifying as either valid or invalid, images in the sequence based on the determined metric values, comprises: for a sub-sequence, comparing the values of different metrics determined in that sub-sequence.

6. A method according to claim 1, wherein the one or more image quality metrics comprise one or more of the following metrics:
   a metric indicative of brightness of an image, a metric indicative of contrast within an image, a metric indicative of blur within an image, a metric indicative of image sharpness, a metric indicative of a level of spatial information within an image, and a metric indicative of spatial entropy of an image.

7. A method according to claim 1, wherein the one or more image quality metrics comprise the following metrics:
   a metric indicative of brightness of an image, a metric indicative of contrast within an image, and a metric indicative of a level of spatial information within an image.

8. A method according to claim 1, wherein the one or more image quality metrics comprises the following metrics:
   a metric indicative of a level of spatial information within an image, and a metric indicative of spatial entropy of an image.

9. A method according to claim 1, comprising:
   for each of the time-steps, measuring a value of a further parameter of the scene fusing a further sensor to produce a further sequence of images of the scene; and
   determining a metric value of the one or more image quality metrics in each image in the further sequence; wherein
   identifying as either valid or invalid, a sub-sequence of images in the sequence based on the determined metric values, comprises comparing the values of a metric determined in that sub-sequence to the values of that metric determined in the further subsequence of images; and wherein:
   the further sub-sequence is a sub-sequence of images in the further sequence;
   the further sub-sequence corresponds to the same time-steps as the sub-sequence;
   the sensor and the further sensor are different types of sensors; and
   the parameter and the further parameter are different parameters.

10. A method of navigating a vehicle, the method comprising processing sensor data according to claim 1.

11. Apparatus for processing sensor data for the purpose of navigating a vehicle, the apparatus comprising:
   a sensor for mounting on the vehicle, the sensor being configured to, for a number of time-steps, measure a value of a parameter of a scene to produce a sequence of images of the scene; and
   one or more processors arranged to:
   determine a metric value of one or more image quality metrics in each image in the sequence, wherein computing said values of said image quality metrics does not include determining position values of the vehicle from the images; and
   identify as either valid or invalid, a sub-sequence of images in the sequence based on an evolution of the determined image quality metric values within that subsequence.

12. Apparatus of claim 11, wherein the one or more processors are configured to perform a perception process for an autonomous vehicle using the image sub-sequences identified as valid.

13. A computer program or plurality of computer programs arranged such that when executed by a computer system will cause the computer system to operate in accordance with the method of claim 1.

14. A machine readable non-transitory storage medium storing a computer program or at least one of a plurality of computer programs for executing the method according to claim 1.

15. A method according to claim 1, wherein each of the one or more image quality metrics determined in each image in the sequence is one of:
   a metric indicative of brightness of an image;
   a metric indicative of contrast within an image;

a metric indicative of a level of spatial information within an image; and a metric indicative of spatial entropy of an image.

16. Apparatus of claim 11, wherein each of the one or more image quality metrics determined in each image in the sequence is one of:

a metric indicative of brightness of an image;

a metric indicative of contrast within an image;

a metric indicative of a level of spatial information within an image; and a metric indicative of spatial entropy of an image.

* * * * *